Figure 1:
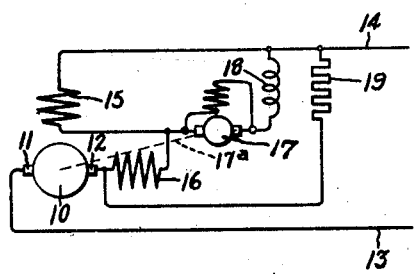

July 17, 1928.

E. F. W. ALEXANDERSON 1,677,700

SYSTEM OF ELECTRICAL DISTRIBUTION

Filed May 13, 1927

Inventor:
Ernst F. W. Alexanderson,
by
His Attorney.

Patented July 17, 1928.

1,677,700

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

SYSTEM OF ELECTRICAL DISTRIBUTION.

Application filed May 13, 1927. Serial No. 191,256.

My invention relates to direct current systems of electrical distribution.

In direct current systems of distribution as heretofore constructed arrangements have been resorted to for protecting the machines in the system against overloads due to line short circuits with a view of avoiding the necessity of using line circuit breakers. These systems have generally included an arrangement for reducing the main field flux in response to the short circuit condition. Such systems as heretofore proposed have not effectively protected the machines against suddenly occurring line short circuits because they were slow in reducing the main field flux in response to the short circuit, and consequently the terminal voltage of the machines was not reduced quickly enough to prevent overloading the machines to some extent before a condition of equilibrium on short circuit was established. The systems heretofore proposed have also been subject to the disadvantage that the changes in the main field flux which they produced caused excessive sparking at the brushes of the dynamo-electric machines during the main field flux changes by inducing circulating currents in the armature winding elements that were short circuited by the brushes during commutation.

It is an object of my invention to construct a system having such electrical characteristics that in case of a sudden increase in load or a line short circuit the resulting surge in line current will cause a very strong opposition to the usual flow of field current in the dynamo-electric machines of the system. This strong opposition to the flow of field current will quickly reduce the field flux of the machines and consequently their terminal voltage, thereby preventing overloading of the machines during the transient occurring immediately preceding the establishment of a condition of equilibrium on short circuit or increased load.

A further object of my invention is to prevent excessive sparking at the brushes of the dynamo-electric machines during the transient occurring in the initial period of the short circuit by producing a transient commutating flux which will induce in the armature conductors short circuited by the brushes during commutation a voltage opposing that induced therein at the same time by reducing the main field flux of the machines.

The features of novelty of my invention are pointed out with particularity in the claims annexed to and forming a part of this specification. For a more complete understanding of my invention, however, reference may be had to the following description taken in connection with the accompanying drawing, in which Fig. 1 is a diagrammatic view of a portion of a system of electrical distribution embodying my invention, and Fig. 2 is a slight modification of the system as illustrated in Fig. 1.

Figure 2:
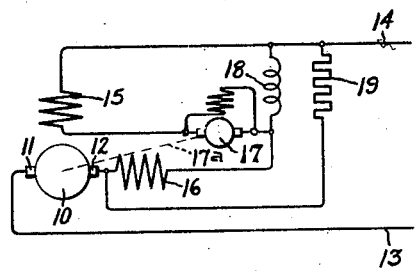

The embodiment of my improved system shown in Fig. 1 of the drawing includes an ordinary dynamo-electric machine which may be used in the system as a direct current generator or motor, but for convenience in describing the invention it will be considered as a generator. The armature 10 of the dynamo-electric machine, which is driven by any suitable means, is connected by circuits including the commutator brushes 11 and 12 to the lines 13 and 14 respectively for supplying current to any desired load. A field flux for the armature is produced by an excitation system including an exciting field winding 15, and a commutating flux is produced by commutating field winding 16. If it is desired a compensating winding of the usual form may also be employed which should be connected in series with the commutating field winding 16 and in the same relation to the remainder of the circuit as the latter. In accordance with my invention, in addition to including the usual exciting and commutating windings for the dynamo-electric machine, the system includes an exciter 17 which may be driven in any convenient manner, for example by connecting it to the shaft of armature 10 as indicated by the dotted line at 17ª, and which is connected across the exciting winding through reactor 18 or other suitable inductance device. The inductance of reactor 18 is much greater than that of the exciting field winding 15 so that when the voltage applied across them in parallel is suddenly increased the rate of change in current in the exciting field winding will be very much more rapid than in the reactor. The circuit from the brush 12 to the line 14 includes the commutating field winding 16, and parallel circuits from the commutating pole winding 16 to the line 14 either through exciter 17 and reactor 18, or through the exciting field winding 15. The polarity and voltage of the exciter relative to the armature 10 is such that the entire current flowing between the armature 10 and the line 14 passes through the reactor 18, instead of through the exciting field winding 15. However, current for the exciting field winding flows therethrough from the exciter 17 in the closed circuit including reactor 18 and through the latter in the same direction as the current flowing between the armature 10 and the line 14.

When a line short circuit occurs on the system substantially the entire external voltage of the armature 10 is applied to the circuits connected between brush 12 and line 14, and it is apparent therefore that a rapid surge in current tends to take place in the circuits between them. Such a surge in current also occurs upon a sudden increase in load on the system. The reactor 18 being of high inductance resists the change in rate of current flow therethrough to a much greater extent than the exciting field winding 15 so that the current flowing between the armature 10 and line 14, which ordinarily flows through reactor 18, will tend to flow during the period of change, through the exciting field winding 15 in the direction opposite to the exciting current. This opposition to the flow of exciting current quickly reduces the field flux and consequently the terminal voltage of the machine so that any damaging overloading of the machine which would otherwise result during the initial period of the short circuit is prevented. The system will then reach a condition of equilibrium on short circuit in which the voltage will again build up to a limited value under the action of the exciter 17. The voltage is limited under this condition by the resistance of the exciting field winding 15 relative to the resistance of exciter 17 and the reactor 18 which are in a circuit in parallel with the field winding between the brush 12 and line 14. The specific relation of these resistances is not of importance and it is only necessary that they be proportioned to limit the field ampere turns of the dynamo-electric machine so that the short circuit current in the system will be within its capacity, which may be readily done by those skilled in the art.

Reducing the field flux of the dynamo-electric machines of the system in order to protect them against overload during the initial period of the short circuit would cause injurious sparking at the brushes, in machines as ordinarily constructed, by inducing circulating currents in the armature winding elements short circuited by the brushes during commutation. As the field flux is very quickly reduced for the protection of the machine this sparking would be severe enough to pit the commutator so that the face would have to be refinished and would therefore require a shut down. I have found that this difficulty can be overcome by increasing the armature current during the period in which the field flux is reduced and thereby produce a transient commutating flux that will induce an electromotive force in the armature winding elements short circuited by the brushes during commutation opposing the electromotive force causing the excessive circulating currents induced therein at the same time by the rapid reduction of the field flux. The desired increase in the armature current during the initial period of the short circuit is caused by a resistance 19 connected directly between the brush 12 and the line 14 which is of high enough resistance to limit the current flow therethrough to a negligible amount in ordinary operation of the system. The inductance of the resistance 19 is very low compared to that of the circuits in parallel therewith including the commutating pole winding 16, so that when a short circuit occurs across lines 13 and 14, which applies substantially the entire generated voltage of armature 10 to the resistance, the current flow therethrough quickly increases and produces an increase in the armature flux. The increase in flux produced by the armature is transverse to the field flux and opposes the flux produced by the commutating field. The increased armature flux induces an electromotive force in the armature winding elements short circuited by the brushes during commutation opposing the electromotive force induced therein at the same time by the reduction of the field flux and prevents injurious sparking at the brushes during the transient in which the field flux is changing.

It will be apparent from the following considerations that the increase in armature current prevents sparking at the brushes as above described. It is well known that during rotation of a generator armature the current flowing in the armature conductors creates a flux transverse the field flux and that this flux is directed along the neutral axis of the armature at right angles to the field flux. The north pole of this flux is adjacent the leading side of the north pole of the field winding. At the moment the armature coil elements cross the neutral axis they are short circuited at the brushes and are undergoing commutation. An armature coil element moving across the neutral axis cuts the flux created by the armature and induces a current flow therein creating a flux opposing the main field flux and tending to decrease the total flux threading the coil element. However, the disappearance of the main field flux during the transient occurring in the initial period of the line short-circuit induces current in these short-circuited coils of the armature which tends to sustain the main field flux. It will thus be seen that the voltages induced in the short-circuited coils by cutting the armature flux and the disappearance of the main field flux oppose each other which prevents excessive sparking at the brushes.

During rotation of the armature, as an armature coil element approaches the neutral axis the field flux threading it increases, it is commutated adjacent the neutral axis, and as the armature continues to rotate in the field the flux threading the coil element decreases. It is well known in the art that when there is any change in the flux threading a coil element a current is induced therein tending to oppose the flux change. It will, therefore, be clear that as a coil element approaches the neutral axis the current flow tends to decrease the flux threading it; and that immediately after the coil element passes the neutral axis the current flow therein tends to increase the flux threading it and sustain the main field flux. The flux produced by the commutating field winding tends to reverse the current flow in the coil element during commutation from the direction of flow in the coil before commutation to that which takes place after commutation. It is therefore apparent that the commutating flux causes a current flow in the armature coil element which increases the flux threading it and is therefore in the wrong direction to suppress sparking at the brushes.

From the foregoing it is clear that the armature flux and not the commutating flux induces the desired electromotive force in the armature coil elements short circuited at the brushes to prevent sparking during the disappearance of the main field flux.

When the field flux is quickly reduced in the dynamo-electric machines of my improved system, the current induced thereby in the armature coil elements short circuited at the brushes tends to resist the change in flux and tends to maintain the field flux threading the coil elements thereby causing heavy circulating currents therein and resulting in sparking at the brushes. This objectionable sparking at the brushes is prevented by the armature flux inducing an electromotive force in these armature coil elements at the time the sparking occurs which opposes that induced therein by the disappearance of the main field flux, so that increasing the armature current during the transient in which the field flux is reduced creates the necessary commutating flux for preventing excessive sparking at the brushes.

In operation of the system shown in Fig. 1 the armature 10 is driven by any suitable means, and supplies a load through lines 13 and 14. Assuming for convenience that the brush 11 is negative and the brush 12 is positive, then the voltage generated by the armature will cause a current flow from the brush 12 to the load through line 14, from whence the current flows back to the armature through the line 13 and brush 11. The flow of current from the brush 12 to the line 14 is divided in two paths, one through the high resistance 19 which limits the current flow in ordinary operation to a very small amount, and the other through compensating or commutating field winding 16, exciter 17, and reactor 18 through which the greatest proportion of the line current flows in ordinary operation. The flow of line current from the brush 12 through compensating winding 16 and field winding 15 is prevented as the polarity and voltage of the exciter 17 is such that it opposes the current flow in that circuit and causes the line current to flow through the reactor 18. In addition to carrying the major portion of the line current the exciter 18 supplies current to the exciting field winding 15 through the reactor 18 which flows through the latter in the same direction as the line current. The current flow in the various circuits of the system during normal operation is as above indicated, the desired compensating or commutating flux being produced by the commutating field winding 16, and the main field flux being produced by the exciting field winding 15. If under this condition the system is subjected to a line short circuit substantially the entire generated voltage of armature 10 is applied to the circuits connected between the brush 12 and the line 14 which causes a sudden surge of current from the armature through these circuits. The inductance of reactor 18 is large compared to the inductance of the exciting field winding 15 so that the reactor resists the change in the rate of current flow therethrough to a much greater extent than the field winding. For this reason, when the short circuit occurs across lines 13 and 14, and the current in the circuits between the brush 12 and the line 14 is thereby suddenly increased, the surge in current through the commutating field winding 16 follows a path of lowest inductance through the exciting field winding 15, which will be noted is in opposition to the current flow through the field winding during normal operation, and which suddenly reduces the field flux. Reducing the field flux in this manner also reduces the terminal voltage of the machine, which definitely limits the line current flow and prevents any damaging overload before a condition of equilibrium in the system on short circuit is established.

To change the field flux in this sudden manner in generators as ordinarily constructed would cause injurious sparking at the brushes, but this is avoided in my improved system because the resistance 19 which in ordinary operation carries a small proportion of the line current, during the initial period of the short circuit carries a heavy current because of the very large increase in the voltage applied thereto as a result of the line short circuit. This increase in current flow through the resistance 19 quickly increases the current flow through the armature which causes it to produce a flux opposing the usual commutating flux and inducing a voltage in the elements of the armature winding short circuited by the brushes at the commutator, which opposes voltage induced therein by the breaking down of the field 18, so that injurious sparking at the brushes during the initial period of the short circuit does not occur.

If the short circuit continues for an appreciable length of time the machine reaches a condition of equilibrium in which its field flux again builds up under the action of the exciter 16. However, the proportioning of the resistances of the current paths through the exciting field winding 15 and reactor 18 is such that the short circuit current will be limited when a condition of equilibrium is reached to approximately twice full load current of the machine.

In the modification of my improved system shown in Fig. 2 the circuit from the commutating field winding 16 to the reactor 18 is at the opposite terminal of exciter 17. This arrangement is such that the exciter 17 need have only capacity for the exciting current and the short circuit current during the transient period of the short circuit, instead of capacity for the normal line current and the exciting current as in the system shown in Fig. 1. This system is otherwise like the system shown in Fig. 1 and its operation is believed to be apparent from the description of the operation of the system of Fig. 1.

Whereas I have described my improved system of distribution as including a direct current generator, it is obvious that my invention is applicable as well for protecting other dynamo-electric machines against line short circuits, and it is intended in the appended claims to cover all modifications which do not depart from the spirit and scope of my invention.

What I claim as new and desire to secure by Letters Patent of the United States is:

1. In a direct current system of electrical distribution, a dynamo-electric machine having an armature with brushes bearing thereon and a field excitation system, means for energizing said excitation system, and means responsive to a sudden increase in load on said system for deenergizing said excitation system and for causing an increased flow of current in said armature during the transient in which said excitation system is deenergized in order to reduce sparking at said brushes.

2. In a direct current system of electrical distribution, a dynamo-electric machine having an armature and an exciting field winding, means for causing a current flow in said exciting field winding in one direction for energizing the same, an inductance device, said inductance device and said field winding being connected in a closed circuit independent of said armature, and means including a circuit from said armature through said inductance device for opposing the flow of current through said exciting field winding in response to a change in the rate of flow of current from said armature in order to reduce the field flux and the voltage generated by said armature upon the occurrence of a short circuit on said system.

3. In a direct current system of electrical distribution, a dynamo-electric machine having an armature and an exciting field winding, a reactor connected in parallel with said field exciting winding, means for causing a flow of current through said reactor and said field winding in one direction for energizing the latter including a closed circuit through said reactor, and means for causing current to flow from said armature through said reactor in the same direction as the current flowing therethrough to said exciting field winding, said reactor being of greater inductance than the circuit therefrom through said exciting field winding for opposing the flow of the field current upon a surge of current from said armature through said reactor in order to reduce the voltage generated by said armature upon the occurrence of a short circuit on said system.

4. In a direct current system of electrical distribution, a dynamo-electric machine having an armature and an exciting field winding, said dynamo-electric machine being provided with a commutator and brushes, means for causing a current flow in said exciting field winding in one direction for energizing the same, an inductance device, said inductance device and said field winding being connected in a closed circuit independent of said armature, means responsive to a change in the rate of flow of current from said armature for opposing the flow of current in said exciting field winding in order to reduce the field flux and the voltage generated by said armature upon the occurrence of a short circuit on said system, and means responsive to the occurrence of a short circuit on said system for causing a current flow in said armature to produce a commutating flux which will induce an electromotive force in that portion of said armature short circuited by the brushes during commutation opposing the electromotive force induced therein at the same time by the reduction of the field flux so that sparking at the brushes will be prevented.

5. In a direct current system of electrical distribution, a dynamo-electric machine having an armature and an exciting field winding, said dynamo-electric machine being provided with a commutator and brushes, means for energizing said exciting field winding, and means for rendering said energizing means ineffective in response to a change in the rate of current flow from said armature in order to reduce the field flux and the voltage generated by said armature upon the occurrence of a short circuit on said system, and means affording a path of low inductance for increasing the current flow in the armature during the change in rate of current flow therefrom for creating a commutating flux for inducing an electromotive force in that portion of said armature short circuited by the brushes during commutation opposing the electro-motive force induced therein at the same time by the reduction of the field flux so that sparking at the brushes will be prevented.

6. In a direct current system of electrical distribution, a dynamo-electric machine having an armature and an exciting field winding, said dynamo-electric machine being provided with a commutator and brushes, means for causing a current flow in said exciting field winding in one direction for energizing the same, means responsive to a change in the rate of flow of current from said armature for opposing the flow of current in said exciting field winding in order to reduce the field flux and the voltage generated by said armature upon the occurrence of a short circuit on said system, and means including a low inductance circuit in parallel with said exciting field winding for increasing the armature current during the reduction of the field flux for inducing an electromotive force in that portion of said armature short circuited by the brushes during commutation opposing the electromotive force induced therein at the same time by reduction of the field flux so that sparking at the brushes will be prevented.

7. In a direct current system of electrical distribution, a dynamo-electric machine having an armature and an exciting field winding, said dynamo-electric machine being provided with a commutator and brushes, means for causing a current flow in said exciting field winding in one direction for energizing the same, a reactor, means including a circuit from said armature through said reactor for opposing the flow of current through said exciting field winding in response to a change in the rate of flow of current from said armature in order to reduce the field flux and the voltage generated by said armature upon the occurrence of a short circuit on said system, and a low inductance circuit between said armature and the line to increase the armature current during the reduction of the field flux for inducing an electromotive force in that portion of said armature short circuited by the brushes during commutation opposing the electromotive force induced therein at the same time by reduction of the field flux so that sparking at the brushes will be prevented.

8. In a direct current system of electrical distribution, a dynamo-electric machine having an armature and a field winding, said dynamo-electric machine being provided with a commutator and brushes, a reactor, means for causing a flow of current through said exciting field winding in one direction for energizing the same including a closed circuit through said reactor, means for conducting current from said armature to and from said reactor that will flow therethrough in the same direction as the field current, said reactor being of greater inductance than the circuit therefrom through said exciting field winding for opposing the flow of the field current upon a surge of current from said armature through said reactor in order to reduce the field flux and the voltage generated by said armature upon the occurrence of a short circuit on said system, and means including a low inductance circuit connected to said armature and in parallel with said exciting field winding for increasing the armature current during the reduction of the field flux for inducing an electromotive force in that portion of said armature short circuited by the brushes during commutation opposing the electromotive force induced therein at the same time by reduction of the field flux so that sparking at the brushes will be prevented.

In witness whereof, I have hereunto set my hand this 12th day of May, 1927.

ERNST F. W. ALEXANDERSON.